United States Patent
Gallucci

Patent Number: 6,060,538
Date of Patent: *May 9, 2000

[54] GLASS REINFORCED POLYCARBONATE-POLYESTER COMPOSITION

[75] Inventor: Robert R. Gallucci, Mt. Vernon, Ind.

[73] Assignee: General Electric Company, Pittsfield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,122

[22] Filed: Jan. 30, 1997

[51] Int. Cl.[7] .................................................. C08K 9/00

[52] U.S. Cl. .............................................................. 523/217

[58] Field of Search ..................................... 523/209, 217; 524/494

[56] References Cited

U.S. PATENT DOCUMENTS

| | | | |
|---|---|---|---|
| 4,581,392 | 4/1986 | Armstrong | 523/209 |
| 5,218,037 | 6/1993 | Orikasa | 524/495 |
| 5,371,123 | 12/1994 | Gallucci | 524/494 |
| 5,384,353 | 1/1995 | Gemmell | 524/494 |

FOREIGN PATENT DOCUMENTS

| | | |
|---|---|---|
| 0 604 078 | 6/1994 | European Pat. Off. . |
| 0 624 621 | 11/1994 | European Pat. Off. . |

*Primary Examiner*—Paul R. Michl

[57] ABSTRACT

A thermoplastic resin composition is provided comprising a polycarbonate resin, polyester resin, and glass fibers which have been treated with polyolefin wax and optionally a functionalized silane. The nature of the coating on the glass fibers provides the composition with improved impact strength over bonding glass. The composition is useful as a molding material.

11 Claims, No Drawings

GLASS REINFORCED POLYCARBONATE-POLYESTER COMPOSITION

FIELD OF THE INVENTION

The present invention is directed to glass reinforced blend of polycarbonate resin and polyester resin containing uniformly fibrous glass.

DESCRIPTION OF THE RELATED ART

Fibrous glass is incorporated with a thermoplastic polymer as an aid to the mechanical properties. In the manufacture of the fibrous glass, filaments are first formed through the use of various processes. The filaments are then gathered into a bundle known as a strand. In order to bind the filaments into a strand so that the strand can be handled, a binder or binding agent is applied to the glass filaments. Subsequently, the strand can be chopped into various lengths as desired. These are called chopped strands. Some of these binding agents are polymers such as polyvinyl acetate, particular polyester resins, starch, acrylic resins, melamine, polyvinyl chloride, polyethylene oxide, polyurethane, polyepoxide, or polyvinyl alcohol.

For thermoplastic aromatic polycarbonate and polyester resins, the fibrous glass enhances the mechanical properties of the resin. Usually, the coatings along with silane coupling agents are designed to give good adhesion of the glass to resin. This adhesion gives rise to improved strength and mechanical properties. Unfortunately, in such ductile resins, the addition of glasses can substantially lower the Izod impact strengths of the fiber reinforced compositions, and, also, substantially reduce the biaxial impact (instrument impact) energies of such compositions.

Poor adhesion of glass fibers to matrix resins results in poor mechanical properties. For example use of an olefinic sizing agent, which does not chemically bond to a polyester resin, gives poor strength and impact. An exception to this trend is polycarbonate resin. Use of an olefinic sizing agent in a glass filled polycarbonate gives reduced tensile and flexural strength vs a standard bonding coating (for example a polyurethane). But surprisingly in unmodified polycarbonate the non bonding fiberglass gives improved impact over the bonding glass coatings. In general the use of non bonding glass in other polymers and blends has not had any beneficial effects on mechanical properties. However, an exception is shown in U.S. Pat. No. 5,384,353 which describes a reinforced blend of aromatic polycarbonate resin and acrylonitrile-butadiene-styrene (ABS) graft copolymers which contain uniformly dispersed therein finely divided fibrous glass which contains a coating agent comprising a polyolefin wax and with a optionally functionalized silane binding agent. Although the polyolefin wax coated fiber gives poor performance in ABS, in the blend, it gives high modulus with better impact than standard glass fibers designed to adhere to the matrix resins. Although the selection of fiberglass coating and resin blend are critical to obtaining improved impact strength, it is difficult to predict the effect of various combinations on impact strength.

Polymer blends containing an aromatic polycarbonate resin, and polyester resin and glass fiber reinforcements have in the past typically shown greater likelihoods of brittle failure and substantial decreases in properties such as notched Izod impact strength.

Accordingly, there is a need to provide glass reinforced polycarbonate/polyester blends exhibiting enhanced properties such as Izod impact strength, biaxial impact energy, ductility and tensile elongation while maintaining stiffness and flexural modulus.

SUMMARY OF THE INVENTION

In accordance with the present invention, thermoplastic resin compositions comprise a polycarbonate resin, a polyester resin and glass fibers which have been treated with a coating agent comprising a polyolefin wax and optionally a bonding agent comprising a functionalized silane binding agent.

The thermoplastic resin compositions are useful as injection molding, extrusion and blow molding, and exhibit improved properties such as increased Izod impact strength, increased biaxial impact energy at maximum load, and increased ductility versus blends made with standard glass fibers giving good adhesion to the matrix.

DETAILED DESCRIPTION OF THE INVENTION

The glass fibers which are uniformly dispersed in the polycarbonate-polyester resin blend are those that have been treated with a coating agent comprising (i) a polyolefin wax and optionally (ii) a functionalized silane binding agent.

These polyolefin waxes preferably comprise polyethylene wax or polypropylene wax or copolymers thereof such as polyethylene-propylene wax and polyethylene-butylene wax. A particularly suitable polyolefinic wax is polyethylene wax. These polyolefin waxes are well known to those skilled in the art and are available commercially. The polyolefin waxes are preferably based on olefins having from 2 to 18 carbon atoms, more preferably from 2 to 8 carbon atoms, and most preferably from 2 to 4 carbon atoms. Alpha olefin-ethylene copolymers are also useful as coating waxes.

The functionalized silanes, such as alkoxy silanes, are preferably selected from the group of aminopropyl triethoxy silane, glycidyl propyl trimethoxy silane, (3,4-epoxycyclohexyl)ethyl trimethoxy silane, mercaptopropyl alkoxy silane, aminoethyl aminopropyl alkoxy silane and ureidoalkyl trimethoxy silanes. Particularly useful are aminopropyl triethoxy silane and glycidyl-propyl trimethoxy silane. Preferred functionality of the functionalized silane is epoxy functionality and/or amine functionality.

Other materials can also be employed with the coating agent so used in this invention and include such materials as antistatic agents, coupling agents, lubricants, wetting agents, etc. In addition, other ingredients may be employed with the thermoplastic compositions such as colorants, fillers, flame retardants, stabilizers and impact modifiers. A critical element is that the coating agent be non-bonding to both the polycarbonate resin and the polyester.

The coating agent preferably comprises at least 50 percent by weight polyolefin wax based on the total weight of the coating agent, for example 50 to 100 percent by weight thereof, preferably from 70 to 95 percent by weight thereof, and most preferably from 75 to 90 percent by weight thereof, and optional further comprises from 1 to 50 percent by weight functionalized silane based on the total weight of the coating agent, preferably from 5 to 30 percent by weight thereof.

The glass fibers that are employed in the practice of this invention are preferably glass strands which have been treated with a coating agent comprising a polyolefin wax and optionally a functionalized silane.

In preparing the glass fibers, a number of filaments can be formed simultaneously, treated with the coating agent and then bundled into what is called a strand. Alternatively the strand itself may be first formed of filaments and then treated with a coating agent. The amount of the coating agent employed is generally that amount which is sufficient to bind the glass filaments into a continuous strand. Generally, this may be about 1.0 weight percent based on the weight of the glass filament. As employed, the glass fibers if in the form of chopped glass strands may be one-fourth inch long or less and are preferably one-eighth inch long. They may also be longer than one-fourth inch in length if desired.

In the practice of this invention, the coated glass fibers, preferably coated, chopped glass strands, may be first blended with the aromatic polycarbonate resin and polyester resin and then fed to an extruder and the extrudate cut into pellets, or they may be separately fed to the feed hopper of an extruder. Generally, in the practice of this invention for preparing pellets of the composition set forth herein, the extruder is maintained at a temperature of approximately 480° F. to 550° F. The pellets so prepared when cutting the extrudate may be one-fourth inch long or less. As stated previously, such pellets contain finely divided uniformly dispersed glass fibers in the blend composition comprising aromatic carbonate polymer and polyester. The dispersed glass fibers are reduced in length as a result of the shearing action on the chopped glass strands in the extruder barrel. In addition, the amount of glass present in the composition can range anywhere from about 5 to about 50 weight percent based on the total weight of the thermoplastic blend composition, preferably from 10 to 20 percent by weight thereof.

The filamentous glass to be coated with the coating agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful in the practice of the present invention, and all such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3–20 microns, but this is not critical to the present invention. Use of non round fiber cross section is also possible.

In preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

The amount of coating agent employed can generally be selected as desired. Typically, the amount ranges from about 0.1 to about 5 by weight, and more typically ranges from about 0.1 to 2% by weight, based on the weight of the glass fibers. The surface coating means can be selected among any known to those skilled in the art. The coating agent may be applied to the glass fibers by conventional means. In general, the fibers are coated by immersing the fibers in the coating agent or contacting the fibers with an aqueous emulsion, or suspension of the coating.

Polyesters include those comprising structural units of the following formula:

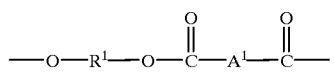

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

U.S. Pat. Nos. 2,465,319 2,720,502 2,727,881 2,822,348 3,047,539 3,671,487 3,953,394 4,128,526

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4-1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore.

The polyesters used herein have an intrinsic viscosity of from about 0.4 to about 2.0 dl/g as measured in a 60:40 phenol/tetrachloroethane mixture or similar solvent at 23°–30° C. Preferably the intrinsic viscosity is 1.1 to 1.4 dl/g. VALOX Registered TM 315 polyester is particularly suitable for this invention.

In preferred embodiments of the present invention, the polyesters are then blended with a polycarbonate resin. Polycarbonate resins useful in preparing the blends of the present invention are generally aromatic polycarbonate resins.

Typically these are prepared by reacting a dihydric phenol with a carbonate precursor, such as phosgene, a haloformate or a carbonate ester. Generally speaking, such carbonate polymers may be typified as possessing recurring structural units of the formula

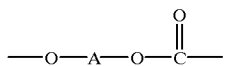

wherein A is a divalent aromatic radical of the dihydric phenol employed in the polymer producing reaction. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4 -hydroxyphenyl) pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethyl-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, and the like.

Other dihydric phenols which are also suitable for use in the preparation of the above polycarbonates are disclosed in U.S. Pat. Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid or hydroxy acid in the event a carbonate copolymer or interpolymer rather than a homopolymer is desired for use in the preparation of the polycarbonate mixtures of the invention. Polyarylates and polyester-carbonate resins or their blends can also be employed. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl) propane (bisphenol-A) and phosgene, commercially available under the trade designation LEXAN Registered TM from General Electric Company.

The instant polycarbonates are preferably high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Pat. Nos. 3,635,895; 4,001,184; and 4,204,047 which are incorporated by reference.

All types of polycarbonate end groups are contemplated as being within the scope of the present invention.

Preferably the glass fibers are present at a level of from 5 to 35 percent by weight based on the total weight of the composition, and more preferably present at a level of from 10 to 20 percent by weight based on the total weight of the composition. The improved impact is most apparent at low glass loadings on the order of 5 to about 20 percent by weight.

The thermoplastic resin compositions of the present invention comprise an aromatic polycarbonate resin, a polyester resin, and coated glass fibers. Beneficial impact improvements have were observed at polycarbonate concentrations that which are about equal to or exceed the concentration of polyester. The ratio of polycarbonate to polyester is preferably greater than 0.9, more preferably greater than 1.0, and even more preferably greater than 1.2.

Preferably the thermoplastic resin composition comprises an aromatic polycarbonate resin present at a level of from 35 to 85 percent by weight based on the total weight of the material, and a polyester resin present at a level of from 5 to 45 percent by weight based on the total weight of the thermoplastic resin composition.

The thermoplastic resin composition may optionally contain impact modifiers such as a rubbery impact modifier. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth)acrylate. The core and/or the shell(s) often comprise multi-functional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169.

Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. Polyolefins such as polyethylene, polyethylene co-polymers with alpha olefins are also of use in these compositions.

Styrene-containing polymers can also be used as impact modifiers. Examples of such polymers are acrylonitrile-butadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), and other high impact styrene-containing polymers.

In the thermoplastic compositions which contain a polyester and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability, of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymer. The acidic phosphate salts include sodium dihydrogen phosphate, mono zinc phosphate, potassium hydrogen phosphate, calcium hydrogen phosphate and the like. The phosphites may be of the formula:

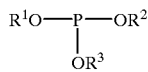

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate salts of a Group IB or Group IIB metals include zinc phosphate, copper phosphate and the like. The phosphorous oxo acids include phosphorous acid, phosphoric acid, polyphosphoric acid or hypophosphorous acid.

The polyacid pyrophosphates of the formula:

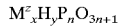

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

The composition of this invention finds utility in preparing or forming articles by injection molding, extrusion, compression molding or blow molding wherein the articles have increased strength by employing the fibrous glass so described herein.

EXAMPLES

The following examples illustrate the present invention, but are not meant to be limitations to the scope thereof.

Polymer blends constituting polycarbonate and polyester and glass fiber reinforcements were prepared by melt mixing. The examples illustrating the present invention employed the addition of a polyolefin coated fiberglass and resulted in a filled product having improved impact strength and toughness compared to products using other glass fiber reinforcements. The experimental blends containing polycarbonate, polyester and various chopped strand glass fibers were melt compounded in a 2.5 inch single screw extruder at 100 rpm and stock temperature of approximately 250° C. to 265° C. Injection molding of test specimens was completed at 500° F. melt temperature and mold temperature was 150° F.

Mechanical properties were measured using ASTM tests D256 (Izod), D638 (Tensile strength and elongation), D790 (Flexural strength and modulus), D3763 (biaxial or instrumented impact). Tables 1, 2, 3 and 4 show formulations of properties of non-bonding glass fiber containing blends and bonding glass blends. The blends of the present invention exhibited improved impact strengths compared to blends using other reinforcing fibers. Improvements were seen in either notched Izod, unnotched Izod, biaxial impact tests and/or elongation.

Tables 1 and 2 show blends of BPA polycarbonate and polybutylene terephthalate in various ratios with either 15 or 30 weight percent fiber glass. The glasses utilized in examples are commercial products of Owens-Corning Co. and have the OC designations set forth. A non-bonding glass (OC415A14C), coated with a polyolefin is compared to a standard glass fiber coating used for polycarbonate and polybutylene terephthalate (OCF183F14C) which is coated with a mixture of a phenoxy resin with an aliphatic polyurethane. As can be see in the data at 15 percent glass filled, the examples of the invention 1–3 of Table 1 show better biaxial impact and unnotched Izod then blends made with the standard glass which is set forth in Table 2, Examples C–E. Surprisingly the beneficial effects are not seen when polybutylene terephthalate content is too much greater than the polycarbonate content. This effect is observed through a comparison of Tables 1; Examples 1, 2, 3 compared to Examples A–B. The improved impact is most apparent at lower glass loading of from about 5 to about 20 percent by weight glass but their is still some improved impact seen at 30 percent glass filled as observed from a comparison of Table 1, Examples 4–5, with Table 2, Examples H–I.

Table 3 shows use of the non-bonding fiber at 11 percent in polycarbonate rich polybutylene terephthalate blend. This example uses a blend of a high viscosity polybutylene terephthatlate, Valox® 315, with a low viscosity polybutylene terephthalate, 195 resin. It also compares a 14 micron diameter bonding glass (OC183F14C) and an 11 micron bonding glass with the same bonding coating (OC183F11C) to the 14 micron diameter non-bonding glass. Biaxial impact and unnotched Izod is improved with the non-bonding glass as illustrated in Table 3, Example 3 vs J and K.

As is clear from the above examples, the compositions of the present invention exhibit improved properties over numerous other conventional fibers having various sizing agents thereon.

Table 4 shows the effect of various rubbery impact modifiers in glass filled PC-PBT blends. As can be seen in comparing the examples of the invention 7–10 to control experiments L-O use of the non bonding glass (OC415A14C) gives improved Izod and biaxial impact and tensile elongation vs blends using the same level of bonding glass (OC183F14C). The use of MBS, core shell acrylic, high rubber graft ABS (HRG-ABS) or polyolefin rubber (LLDPE) in combination with the non bonding glass gives even better impact than use of the glass by itself.

TABLE 1

PC:PBT Blends with Non Bonding Glass

|  | -1 | -2 | -3 | A | B | -4 | -5 |
|---|---|---|---|---|---|---|---|
| PC105 | 62.75 | 50 | 41.5 | 33 | 20.25 | 51.5 | 34 |
| PBT315 | 21.25 | 34 | 42.5 | 51 | 63.75 | 17.5 | 35 |
| OC415A14C | 15 | 15 | 15 | 15 | 15 | 30 | 30 |
| H3PO3 | 0.08 | 0.08 | 0.08 | 0.08 | 0.08 | 0.08 | 0.08 |
| PC/carbon black (80/20) | 1.0 | 1.0 | 1.0 | 1.0 | 1.0 | 1.0 | 1.0 |
| PC/PBT | 3/1 | 1.5/1 | 1/1 | 3/3 | 1/3 | 3/1 | 1/1 |
| Biaxial Impact (total energy) ft-lbs | 24.4 | 20.9 | 9.3 | 3.8 | 2.5 | 19.5 | 17.6 |
| Un Izod | 23 | 26 | 21 | 17 | 15 | 13 | 10 |
| N Izod | 2.6 | 1.8 | 1.4 | 1.1 | 1.0 | 3.3 | 2.4 |
| Flex Mod (Kpsi) | 596 | 555 | 552 | 552 | 613 | 900 | 938 |
| Flex Str (Kpsi) | 15.1 | 14.7 | 14.4 | 14.2 | 14.7 | 15.0 | 14.7 |
| Ten Str (Kpsi) | 7.9 | 6.9 | 7.6 | 7.9 | 7.9 | 8.9 | 8.8 |
| Elong % | 5 | 7 | 6 | 5 | 5 | 2 | 2 |

Izod = ft-lbs/in. Type I tensile bars

TABLE 2

PC:PBT Blends with Bonding Glass (control experiments)

|  | C | D | E | F | G | H | I |
|---|---|---|---|---|---|---|---|
| PC105 | 62.75 | 50 | 41.5 | 33 | 20.25 | 51.5 | 34 |
| PBT315 | 21.25 | 34 | 42.5 | 51 | 63.75 | 17.5 | 35 |
| OC183F14C | 15 | 15 | 15 | 15 | 15 | 30 | 30 |
| H3PO3 | 0.08 | 0.08 | 0.08 | 0.08 | 0.08 | 0.08 | 0.08 |
| PC/carbon black (80/20) | 1.0 | 1.0 | 1.0 | 1.0 | 1.0 | 1.0 | 1.0 |
| PC/PBT | 3/1 | 1.5/1 | 1/1 | 3/3 | 1/3 | 3/1 | 1/1 |
| Biaxial Impact (total energy) ft-lbs | 15.1 | 10.9 | 4.4 | 3.5 | 2.8 | 17.0 | 14.5 |
| Un Izod | 16 | 16 | 15 | 15 | 13 | 12 | 12 |
| N Izod | 1.7 | 1.6 | 1.3 | 1.1 | 0.9 | 2.0 | 1.8 |
| Flex Mod (Kpsi) | 530 | 513 | 540 | 516 | 516 | 850 | 847 |
| Flex Str (Kpsi) | 18.3 | 18.9 | 18.0 | 17.7 | 17.6 | 21.7 | 21.9 |
| Ten Str (Kpsi) | 11.1 | 10.8 | 11.2 | 11.1 | 11.1 | 14.4 | 14.7 |
| Elong % | 5 | 5 | 5 | 4 | 5 | 3 | 3 |

Izod = ft-lbs/in. Type I tensile bars.

TABLE 3

11% GF-PC-PBT Blends

|  | -J | -K | 6 |
|---|---|---|---|
| PC141 | 60 | 60 | 60 |
| PBT315 | 18.6 | 18.6 | 18.6 |
| PBT 195 | 8.38 | 8.38 | 8.38 |
| OC183F14C | 11 | — | — |
| OC183F11C | — | 11 | — |
| OC415A14C | — | — | 11 |
| H3PO3 | 0.08 | 0.08 | 0.08 |
| PC/carbon black (80/20) | 1.0 | 1.0 | 1.0 |
| PC/PBT | 2.2 | 2.2 | 2.2 |
| Biaxial Impact (total energy) ft-lbs | 6.4 | 3.9 | 20.4 |
| Un Izod | 16 | 15 | 25 |
| N Izod | 1.4 | 1.4 | 1.4 |
| Flex Mod (Kpsi) | 482 | 507 | 492 |
| Flex Str (Kpsi) | 17.3 | 18.4 | 15.2 |
| Ten Str (Kpsi) | 10.0 | 11.3 | 6.8 |
| Elong % | 5 | 5 | 7 |

All blends also had 0.2 parts hindered phenol Irganox ® 1076, arylphosphite Irgaphos ® 168 and thioester Seenox ® 412S

TABLE 4

Impact Modified PC:PBT Blends with Bonding and Non Bonding Glass

|  | 7 | 8 | 9 | L | M | N | 10 | O |
|---|---|---|---|---|---|---|---|---|
| PC105 | 50 | 50 | 50 | 50 | 50 | 50 | 49.2 | 49.2 |
| PBT315 | 25 | 25 | 25 | 25 | 25 | 25 | 32.8 | 32.8 |
| OC415A14C | 15 | 15 | 15 | — | — | — | 15 | — |
| OC183F14C | — | — | — | 15 | 15 | 15 | — | 15 |
| H3PO3 | 0.08 | 0.08 | 0.08 | 0.08 | 0.08 | 0.08 | MZP | MZP |
| I-1076 | 0.1 | 0.1 | 0.1 | 0.1 | 0.1 | 0.1 | — | — |
| EXL2691 | 10 | — | — | — | — | 10 | — | — |
| EXL3330 | — | 10 | — | — | 10 | — | — | — |
| HRGABS | — | — | 10 | 10 | — | — | — | — |
| LLDPE | — | — | — | — | — | — | 3 | 3 |
| Biaxial Impact (total energy) ft-lbs | 26 | 25 | 27 | 18 | 19 | 13 | 29 | 13 |
| Un Izod | 30 | 37 | 39 | 14 | 15 | 8 | 28 | 13 |
| N Izod | 5.2 | 6.1 | 6.6 | 4.2 | 4.3 | 2.6 | 2.6 | 2.2 |
| Flex Mod | 461 | 477 | 439 | 441 | 467 | 473 | 587 | 541 |
| Flex Str | 11.9 | 11.7 | 11.3 | 14.3 | 15.1 | 14.1 | 13.1 | 16.4 |
| Ten Str yield | 7.4 | 7.7 | 7.2 | 9.3 | 10.0 | 9.5 | 8.2 | 11.1 |
| Ten Str break | 5.7 | 6.1 | 5.8 | — | 9.6 | 9.1 | 6.2 | 10.6 |
| Elong % | 7 | 6 | 9 | 3 | 5 | 5 | 10 | 4 |

Izod = ft-lbs/in.
Flex mod & Str. = Kpsi
EXL2691 is a methacrylate-butadiene-styrene (MBS) core shell impact modifier.

TABLE 4-continued

Impact Modified PC:PBT Blends with Bonding and Non Bonding Glass

| | 7 | 8 | 9 | L | M | N | 10 | O |

EXL3330 is a butylacrylate-methacrylate core shell rubber. Both from the Rohm & Haas company.
HRGABS is a high rubber content (>75%) polybutadiene graft styrene-acrylonitrile rubber. LLDPE is a linear low density polyethylene; ethylene-butene copolymer.
I-1076 is a hindered phenol antioxidant.
H3PO3 is 45% aqueous phosphorous acid.
MZP = 0.3% mono zinc phosphate dihydrate

We claim:

1. A molded thermoplastic resin composition consisting essentially of:
   a) a polycarbonate, a rubbery impact modifier, and a polyester resin wherein the ratio of polycarbonate to polyester is greater than or equal to about 1.2, said polycarbonate resin being present at a level of from 40 to 85 percent by weight based on the total weight of the composition and said polyester is present at a level of from 5 to 45 percent by weight based on the total weight of said composition and
   b) non-bonding glass fibers present at a level of from 10 to 20 percent by weight based on the total weight of the composition, said glass fibers having been treated with a coating agent comprising a polyolefin wax, said rubbery impact modifier comprises methylacrylate-butadiene-styrene, acrylic or graft or core shell rubber impact modifier, said molded thermoplastic resin having a biaxial impact in ft-lbs equal to or greater than about 20.9 and an Unnotched Izod equal to or greater than about 30 wherein said properties are measured using ASTM tests D256 for Iod and ASTM test D3763 for biaxial impact.

2. The composition of claim 1 wherein said polycarbonate resin is an aromatic polycarbonate resin.

3. The composition of claim 2 wherein said polycarbonate resin is bisphenol A polycarbonate resin.

4. The composition of claim 1 wherein said polycarbonate resin is a branched polycarbonate.

5. The composition of claim 1 wherein said polyester resin composition comprises structural units of the following formula:

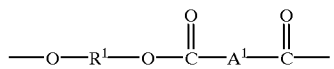

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

6. The composition of claim 1 wherein said polyester is selected from the group consisting essentially of poly (ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PFT"), and mixtures thereof.

7. The composition of claim 1 wherein said coating agent further comprises a functionalized silane.

8. The composition of claim 7 wherein said functionalized silane is selected from the group consisting of aminopropyl alkoxy silane, glycidyl propyl alkoxy silane, (3,4-epoxycyclohexyl)ethyl alkoxy silane, mercaptopropyl alkoxy silane, aminoethyl aminopropyl alkoxy silane, and ureido-alkyl alkoxy silanes.

9. The composition of claim 7 wherein said coating agent consists of said polyolefin wax and an amino alkyl alkoxy silane.

10. The composition of claim 1 wherein said coating agent is present in an amount of from 0.1 to 2.0 weight percent based on the total weight of said glass fibers.

11. The composition of claim 1 comprising and effective amount of a stabilizer selected from the group consisting of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof.

* * * * *